United States Patent [19]

Kosaka et al.

[11] Patent Number: 4,807,071
[45] Date of Patent: Feb. 21, 1989

[54] MECHANISM FOR PREVENTING DAMAGE TO THE MAGNETIC HEAD AND MEDIUM OF A MAGNETIC RECORDING/REPRODUCING APPARATUS DURING TRANSPORT

[75] Inventors: Norifumi Kosaka; Hiroshi Kobayashi, both of Iwate, Japan

[73] Assignee: Matsushita Electric Industrial Co., Ltd., Osaka, Japan

[21] Appl. No.: 110,026

[22] Filed: Oct. 13, 1987

Related U.S. Application Data

[63] Continuation of Ser. No. 710,909, Mar. 12, 1985, abandoned.

[30] Foreign Application Priority Data

Mar. 12, 1984 [JP] Japan .................. 59-47456
Mar. 14, 1984 [JP] Japan .................. 59-49550

[51] Int. Cl.$^4$ .................................. G11B 5/54
[52] U.S. Cl. .................................. 360/105; 360/75
[58] Field of Search ............ 360/70, 72.1, 75, 78, 360/104, 105, 106, 109, 135, 97, 98, 99; 369/244, 257, 268, 233, 234

[56] References Cited

U.S. PATENT DOCUMENTS

| | | | |
|---|---|---|---|
| 3,518,651 | 6/1970 | Keeney | 360/75 |
| 4,139,874 | 2/1979 | Shiroishi | 360/105 X |
| 4,164,769 | 8/1979 | Kaseta et al. | 360/106 |
| 4,395,742 | 7/1983 | Ostroff | 360/106 X |
| 4,484,241 | 11/1984 | Brende et al. | 360/105 |
| 4,562,500 | 12/1985 | Bygdnes | 360/105 |

Primary Examiner—Robert S. Tupper
Assistant Examiner—Andrew L. Sniezek
Attorney, Agent, or Firm—Burgess, Ryan & Wayne

[57] ABSTRACT

This invention relates to a magnetic recording/reproducing apparatus wherein a power switch is turned on to automatically move a magnetic head in a shipping zone which is formed substantially near the central portion of the magnetic recording medium and which is not subjected to data recording or reproduction, and the power switch is turned off to lock the magnetic head while the magnetic head is held in the shipping zone. One of holes selectively engaged with a projection of a plunger and respectively formed in a lock lever for regulating the magnetic head movement and in a brake lever for regulating rotation of a rotor has a circular shape and the other has an elongated shape. When the plunger is attracted by the solenoid, the lock lever and the brake lever are moved at different timings. A load acting on the solenoid is decreased, so that the solenoid requires a low power and has a compact size.

3 Claims, 6 Drawing Sheets

MECHANISM FOR PREVENTING DAMAGE TO THE MAGNETIC HEAD AND MEDIUM OF A MAGNETIC RECORDING/REPRODUCING APPARATUS DURING TRANSPORT

This application is a continuation, of application Ser. No. 710,909, filed 3/12/85, now abandoned.

BACKGROUND OF THE INVENTION

I. Field of the Invention

The present invention relates to a magnetic recording/reproducing apparatus such as a fixed disk drive or a floppy disk drive.

II. Brief Description of the Prior Art

In conventional disk drives such as fixed and floppy disk drives, various measures have been taken to prevent damage to the magnetic head and magnetic medium due to an undesirable friction therebetween when these drives are transported or moved.

In a typical method for preventing the above problem, a case is temporarily removed from the disk drive, and the magnetic head and the associated arm are fixed by screws to the main unit when the disk drive is to be transported.

However, the removal of the screws is time-consuming and cumbersome. When a disk drive is moved for a short distance, e.g., from room to room, maintenance personnel often forget or neglect to fix the head and the like by the screws. As a result, the magnetic head and the magnetic medium are often damaged due to vibration and shock.

The present inventors previously proposed a mechanism wherein a lock lever and a brake lever biased by springs were released to stop a capstan and a rotor upon deenergization of a solenoid when power to the disk drive is turned off, thereby preventing damage. However, when the disk drive is powered, the lock lever and the brake lever must be simultaneously attracted by the solenoid against the biasing force of the spring. Therefore, a high-power solenoid must be used, resulting in inconvenience.

SUMMARY OF THE INVENTION

It is an object of the present invention to solve the conventional problems and provide a new and improved magnetic recording/reproducing apparatus wherein a magnetic head or the like can be easily and simply locked.

It is another object of the present invention to provide a magnetic recording/reproducing apparatus wherein a solenoid for locking the magnetic head or the like requires low power and is compact in size.

According to an aspect of the present invention, there is provided a magnetic recording/reproducing apparatus comprising: a magnetic recording/reproducing unit for recording/reproducing data upon rotation of a magnetic medium; moving means for automatically moving the magnetic head to a central portion, i.e., a so-called shipping zone which is not subjected to recording/reproduction, of the magnetic medium when a power switch is turned on; and lock means for locking an arm coupled to the magnetic head by deenergizing the apparatus while the magnetic head is stopped in the shipping zone.

According to another aspect of the present invention, there is provided a magnetic recording/reproducing apparatus comprising: a magnetic medium having a data zone subjected to data recording and reproduction and a shipping zone which is not subjected to data recording or reproduction; magnetic medium driving means for rotating the magnetic medium; magnetic head moving means for moving the magnetic head along the magnetic medium upon rotation of a motor; control means for controlling the magnetic head moving means to move the magnetic head to the shipping zone when the apparatus is powered and is not performing data recording or reproduction; and lock means for locking the magnetic head moving means in the shipping zone by deenergizing the apparatus.

According to an arrangement of the locking means, the locking means comprises a lock lever biased by a spring; a solenoid for attracting the lock lever against a biasing force of the spring upon energization of the apparatus and releasing the lock lever upon deenergization of the apparatus; a rotary member coaxially mounted on a rotating shaft of the motor of the magnetic head moving means and having a projection extending radially outward therefrom; and a stopper engaged with the projection of the rotary member so as to stop the magnetic head in the shipping zone, whereby the stopper and the lock lever clamp the projection of the rotary member when the apparatus is deenergized.

According to still another aspect of the present invention, there is provided a magnetic recording/reproducing apparatus further comprising brake means for braking and locking the magnetic medium driving means upon deenergization of the apparatus. The brake means and the lock means comprise: a lock lever, biased by a first spring and having a first hole, for urging a first rotary member coupled to the motor of the magnetic head moving means; a brake lever, biased by a second spring and having a second hole, for urging second rotating means arranged in the magnetic medium driving means; a plunger having a projection selectively engaged with the first and second holes; and a solenoid which is energized or deenergized to attract or release the plunger upon energization or deenergization of the apparatus, one of the first and second holes being formed to be tightly fitted with the projection of the plunger, and the other of the first and second holes being formed to be loosely fitted with the projection of the plunger, whereby the lock lever and the brake lever are started to move at different timings when the plunger is attracted by the solenoid.

According to the present invention, the magnetic head is moved in the shipping zone which is not subjected to recording/reproduction of the magnetic medium when the power switch is turned on. When the power switch is turned off, the solenoid releases the plunger and the lock lever urges the projection of the rotary member by the biasing force of the spring, thereby fixing the capstan and the recording head. In this manner, the magnetic head is moved to the shipping zone upon temporary energization of the apparatus, and the apparatus is then deenergized to lock the magnetic head in the current position of the shipping zone. Therefore, the lock operation of the magnetic head can be achieved simply by the ON/OFF operation of the power switch.

One of the holes selectively engaged with the projection of the plunger and respectively formed in the lock lever for regulating the magnetic head movement and in the brake lever for regulating rotation of the rotor has a circular shape and the other has an elongated shape. When the plunger is attracted by the solenoid, the lock lever and the brake lever are moved at different timings. A load acting on the solenoid is thus decreased, so that the solenoid requires a low power and has a compact size.

DESCRIPTION OF THE PREFERRED EMBODIMENT

Figure 1:
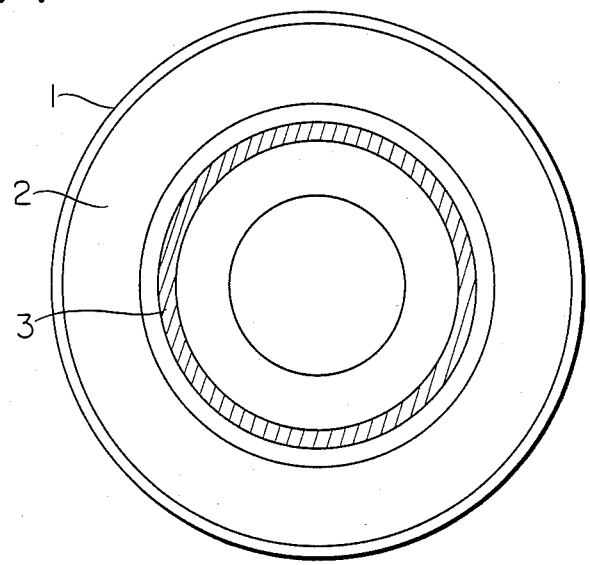
FIG. 1 is a plan view of a magnetic recording medium according to an embodiment of the present invention.

Referring to FIG. 1, a magnetic recording medium 1 has a data zone 2 and a shipping zone 3. The data zone 2 is used to record or reproduce data. The shipping zone 3 is used to lock the magnetic head in position. Data is not recorded in or reproduced from the shipping zone 3.

Figure 2:
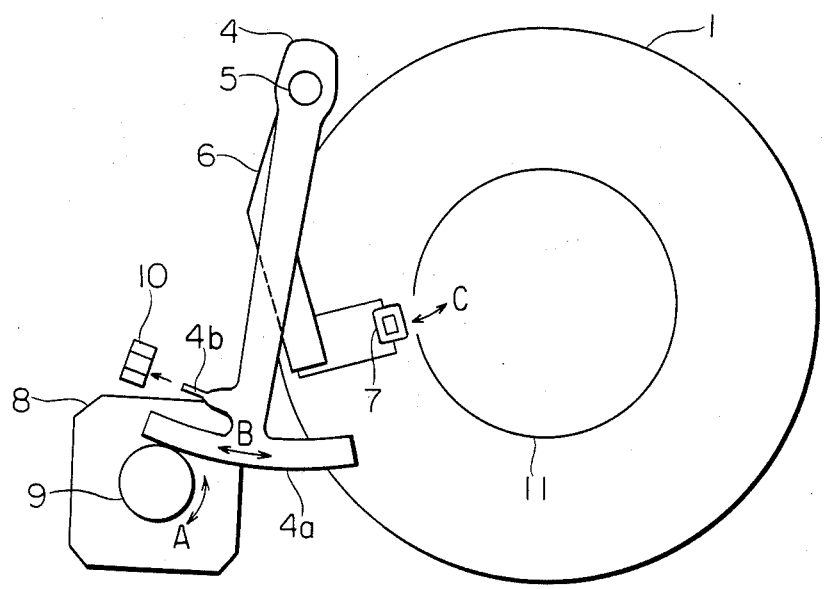
FIG. 2 is a plan view showing a relationship between the magnetic recording medium shown in FIG. 1 and a magnetic head.

As shown in FIG. 2, a magnetic head drive mechanism comprises an actuator arm 4 pivotal about a shaft 5 and a head arm 6 integrally formed with the actuator arm 4. A head 7 is mounted at the distal end of the head arm 6 to record data in or reproduce data from the magnetic recording medium 1. An arcuated projection 4a is formed at the distal end of the actuator arm 4. The arcuated projection 4a is engaged with a capstan 9 through an α-winding metal band or the like. The arcuated projection 4a converts a rotational force of the capstan 9 along the A direction to movement of the actuator arm 4 along the B direction. The capstan is stepwisely pivoted by a stepping motor 8. A rotor 11 stabilizes rotation of the magnetic recording medium 1 and is connected to a spindle motor. A shielding member 4b is disposed near the distal end of the actuator arm 4. A photointerrupter 10 is arranged at a specific position along the locus of the shielding member 4b.

Figure 3:
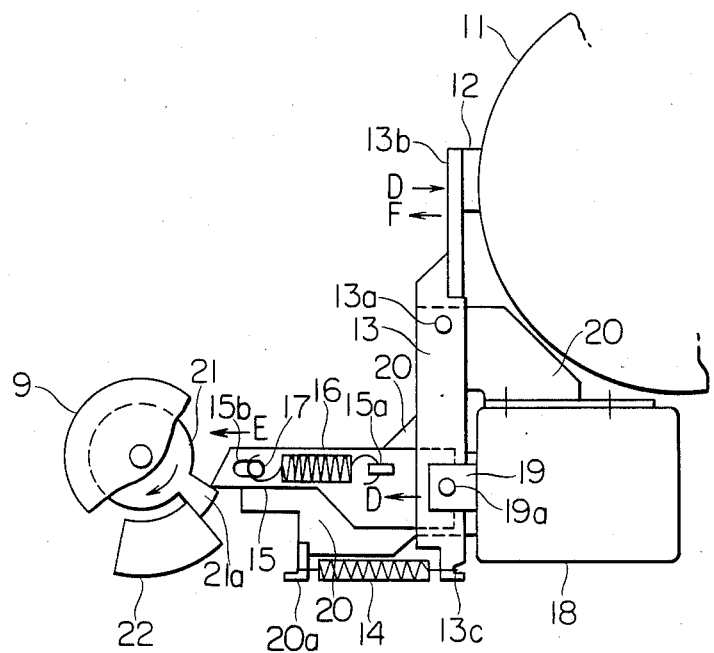
FIG. 3 is an enlarged plan view showing the main part of a magnetic recording/reproducing apparatus of the embodiment.

FIG. 3 shows the main part of a magnetic recording-/reproducing apparatus according to an embodiment of the present invention. Referring to FIG. 3, a brake lever 13 is pivotal about a shaft 13a. A brake shoe 12 is mounted at a distal end 13b of the brake lever 13 and can be brought into contact with the outer circumferential surface of the rotor 11. A spring 14 is connected to an engaging piece 13c to bias the brake lever 13 in the D direction. A lock lever 15 is normally biased by a spring 16 along the D direction and is movable along the longitudinal direction thereof. A plunger 19 which is attracted by a solenoid 18 is coupled to the brake lever 13 and the lock lever 15 through a projection 19a of the plunger 19.

The shaft 13a of the brake lever 13, a pin 17 for fixing one end of the spring 16, and an engaging piece 20a for fixing one end of the spring 14 are fixed on a chassis 20 for mounting the solenoid 18 thereon.

A projection 21a is integrally formed to extend from the outer circumferential surface of a rotary member 21 rotated together with the capstan 9 by the stepping motor 8. A stopper 22 is provided for regulating the pivotal movement of the projection 21a.

Figure 4:
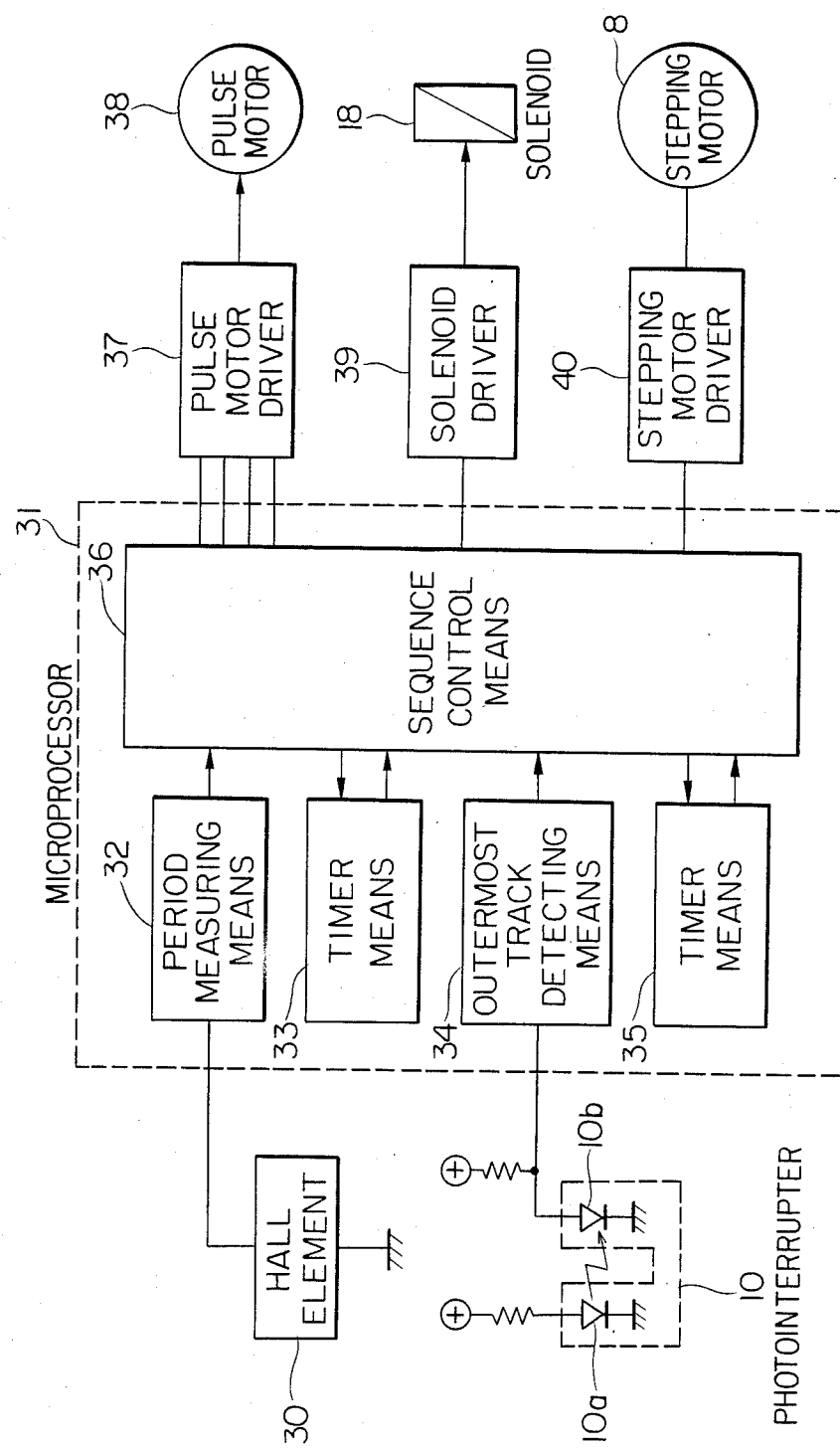
FIG. 4 is a block diagram of the magnetic recording-/reproducing apparatus shown in FIG. 3.
Figure 5:
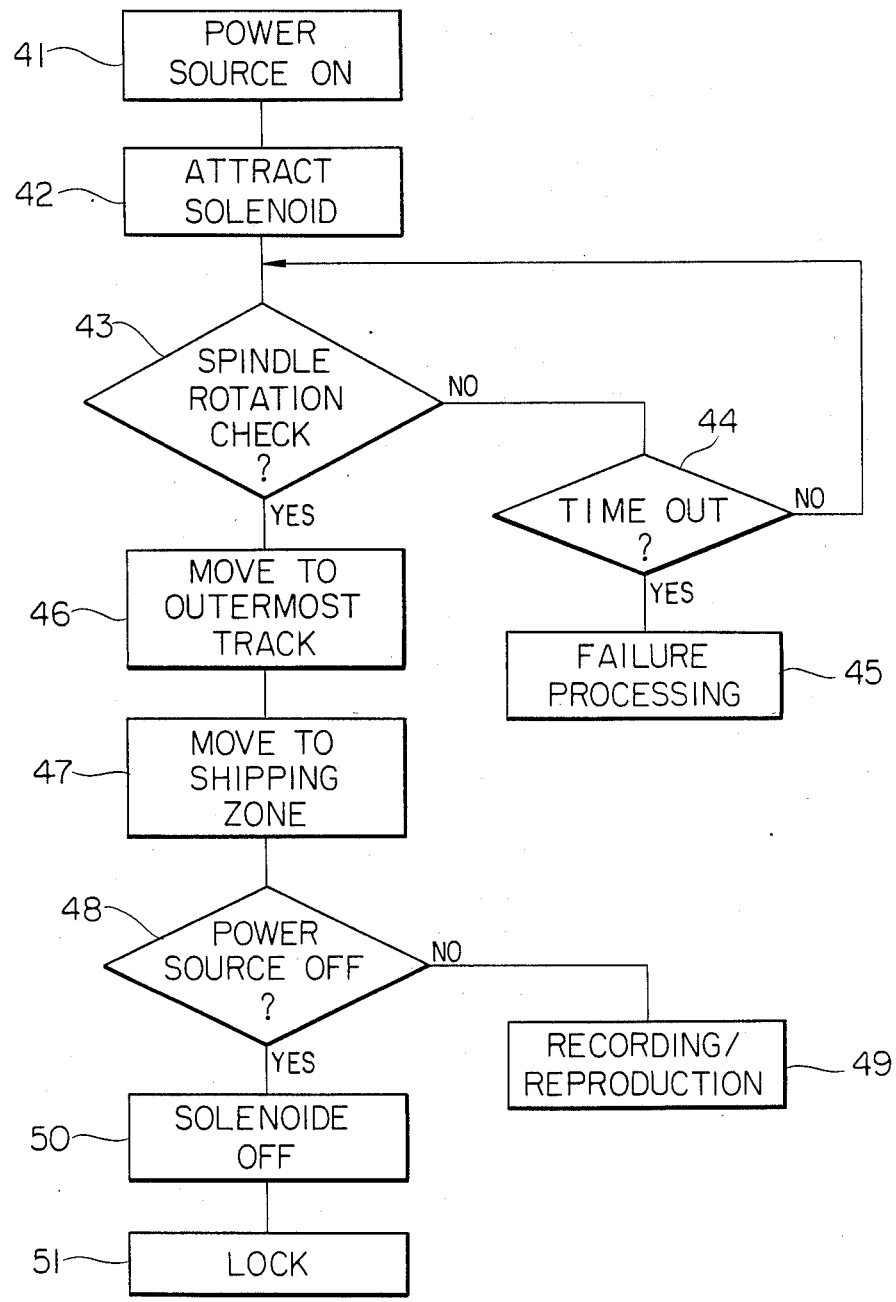
FIG. 5 is a flow chart for explaining the operation of the apparatus shown in FIG. 3.

Referring to FIG. 4, reference numeral 30 denotes a Hall element for detecting the rotational speed of a pulse motor 38 for rotating the rotor 11; 31, a microprocessor for receiving signals from the Hall element 30 and the photointerrupter 10 to control the operation of the pulse motor 38 and the solenoid 18; and 32, a period measuring means incorporated within the microprocessor 31. The period measuring means 32 receives an output signal from the Hall element 30 to detect the rotational speed of the pulse motor 38 and determines whether the actual rotational speed is higher or lower than a predetermined rotational speed (number of revolutions within a predetermined time interval counted by a timer means 33).

The photointerrupter 10 comprises a light-emitting diode 10a and a photodiode 10b. Light emitted from the light-emitting diode 10a is detected by the photodiode 10b. When light from the light-emitting diode 10a is shielded by the shielding member 4b of the actuator arm 4, an outermost track detecting means 34 detects that the magnetic head 7 is located in the outermost track of the magnetic recording medium 1. An output signal from the outermost track detecting means 34 is supplied to a sequence control means 36.

Reference numeral 35 denotes a timer means for detecting a rotating time of the stepping motor 8. The timer means 35 detects if the rotating time of the stepping motor 8 is proportional to the moving distance of the track of the magnetic recording medium 1.

Reference numeral 37 denotes the pulse motor driver for driving the pulse motor 38 in response to a signal from the sequence control means 36. The pulse motor 38 rotates the magnetic recording medium 1 and the rotor 11 for stabilizing the rotation of the magnetic recording medium 1. Reference numeral 39 denotes a solenoid driver for energizing or deenergizing the solenoid 18.

Figure 9:
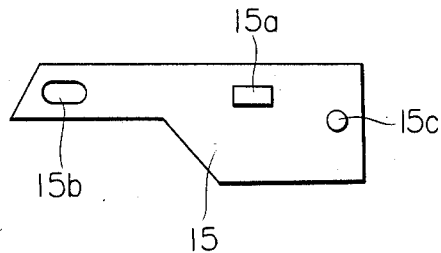
FIG. 9 is a plan view of a lock lever in the apparatus shown in FIG. 6.

Referring to FIG. 9, the lock lever 15 comprises a projection 15a engaged with the spring 16, an elongated hole 15b into which the pin 17 on the chassis 20 is inserted, and a circular hole 15c into which the projection 19a of the plunger 19 is inserted. When the pin 17 is guided along the elongated hole 15b, the lock lever 15 is smoothly moved along the D or E direction of FIG. 3 to lock the projection 21a of the rotary member 21. The diameter of the circular hole 15c is determined such that the projection 19a of the plunger 19 fits tightly therein.

Figure 10:
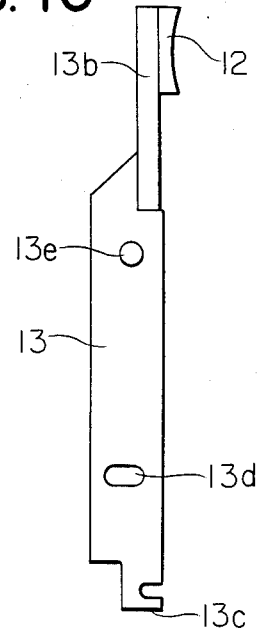
FIG. 10 is a plan view of a brake lever in the apparatus shown in FIG. 6.

As shown in FIG. 10, the brake lever 13 has a circular hole 13e into which the shaft 13a is inserted to allow pivotal movement of the lever 13 mounted on the chassis 20 therethrough, one end portion 13b on which the brake shoe 12 is mounted, the engaging piece 13c engaged with the spring 14, and an elongated hole 13d into which the projection 19a of the plunger 19 is inserted. The size of the elongated hole 13d is larger than the projection 19a of the plunger 19. When the solenoid 18 attracts the plunger 19, the brake shoe 12 is separated from the rotor 11. However, when the plunger 19 is released from the solenoid 18, the brake shoe 12 is biased by the biasing force of the spring 14 to stop the rotation of the rotor 11.

The operation of the magnetic recording/reproducing apparatus having the construction described above will be described hereinafter. Referring to FIGS. 1 to 5, when the magnetic disk drive is not energized, the positional relationship between the capstan 9 and the arcuated projection 4a is illustrated in FIG. 2. In addition, the projection 21a of the rotary member 21 is fixed by the stopper 22 and the lock lever 15 biased by the spring 16. Therefore, the capstan 9, the actuator arm 4 and the magnetic head 7 are also locked. In this, case, the magnetic head 7 is located above the shipping zone 3 of the magnetic recording medium 1. The rotor 11 is stopped by the brake shoe 12 biased by the spring 14.

When the apparatus is powered (step 41 in FIG. 5), the sequence control means 36 is started to cause the solenoid 18 to attract the plunger 19 through the solenoid driver 39 (step 42). When the solenoid 18 starts attracting the plunger 19, the lock lever 15 is moved along a direction opposite to the E direction against the biasing force of the spring 16. The brake lever 13 is pivoted along the F direction against the biasing force of the spring 14. In this case, the rotary member 21 is released, and the rotor 11 can be freely rotated.

The sequence control means 36 drives the pulse motor 38 through the pulse motor driver 37. Since the pulse motor 38 is not smoothly rotated, rotation of the motor 38 is smoothened by the inertia of the rotor 11. The rotational speed of the rotor 11 is detected by the Hall element 30, and the sequence control means 36 checks whether or not the detected rotational speed is the predetermined rotational speed. The sequence control means 36 performs spindle rotation check (step 43).

When the actual speed of the rotor 11 has not reached the predetermined speed, the microprocessor 31 checks in step 44 whether or not the preset time interval has elapsed by referring to the timer means 33. The timer means 33 measures a predetermined length of time after the pulse motor 38 is started. If N (i.e., NO) in step 44, the sequence control means 36 performs spindle rotation check again in step 43. When the actual rotational speed has not reached the predetermined rotational speed even when the predetermined period (e.g., 20 seconds) of time has elapsed, step 44 is determined to be Y (i.e., YES). Failure processing is then performed in step 45.

If Y in step 43, i.e., when the actual rotational speed reaches the predetermined rotational speed within the predetermined period of time, the sequence control means 36 drives the stepping motor 8 through the stepping motor driver 40, and the actuator arm 4 shown in FIG. 2 is rotated clockwise to move the magnetic head 7 to the outermost track in step 46. When the shielding member 4b shields light from the photointerrupter 10, the outermost track detecting means 34 detects that the magnetic head 7 is located on the outermost track of the magnetic recording medium 1.

The sequence control means 36 drives the stepping motor 8 through the stepping motor driver 40 in response to the signal from the outermost track detecting means 34, and the magnetic head 7 is moved to the shipping zone in step 47 while the timer means 35 measures the time elapsed.

The microprocessor 31 checks in step 48 whether or not the apparatus is turned off. If N in step 48, the magnetic recording medium is subjected to recording or reproduction in step 49. However, if Y in step 48, the solenoid 18 is turned off in step 50. The lock operation is performed in step 51 such that the lock lever 15 in FIG. 3 abuts against the projection 21a of the rotary member 21 which in turn abuts against the stopper 22 to lock the capstan 9 and the magnetic head 7 since the magnetic head 7 is located in the shipping zone 3. In addition, the brake shoe 12 in the brake lever 13 abuts against the rotor 11 to stop the pivotal movement thereof.

In this embodiment, when the power switch is turned on, the magnetic head 7 is located in the shipping zone 3. When the power switch is immediately turned off, the magnetic head 7 is locked by the biasing force of the spring 16. In this case, the rotor 11 is also stopped by the biasing force of the spring 14 through the brake shoe 12.

When the magnetic disk drive is turned off, the positional relationship between the capstan 9 and the arcuated projection 4a is as illustrated in FIGS. 2 and 3. The projection 21a of the rotary member 21 is fixed by the stopper 22 and the lock lever 15 biased by the spring 14. The capstan 9, the actuator arm 4 and the magnetic head 7 are also locked. In this case, the magnetic head 7 is located in the shipping zone 3 of the magnetic recording medium 1. The rotor 11 is also stopped by the brake shoe 12 biased by the spring 14.

Figure 6:
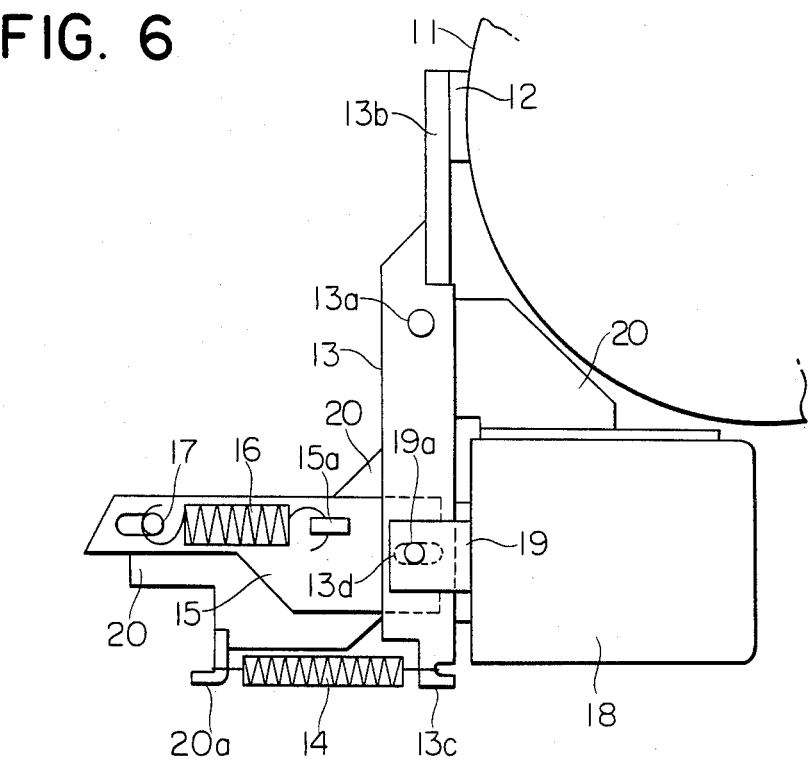
FIG. 6 is a plan view showing the releasing state of the solenoid in the apparatus shown in FIG. 3.

When the projection 21a of the rotary member 21 is locked by the lock lever 15, the projection 19a of the plunger 19 is positioned substantially at the center of the elongated hole 13d of the brake lever 13, as shown in FIG. 6. Since the brake lever 13 is biased clockwise by the spring 14 about the shaft 13a and the rotor 11 is biased by the brake shoe 12, the projection 19a is loosely fitted at the center of the elongated hole 13d.

Figure 7:
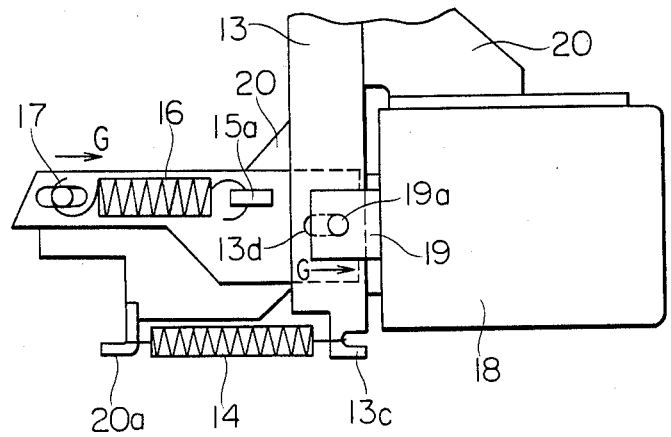
FIG. 7 is a plan view showing an attracting state of the solenoid shown in FIG. 6.

When the disk drive is powered, the solenoid 18 attracts the plunger 19 along the G direction so as to releaser the magnetic head 7 in the first step. In this case, as shown in FIG. 7, the lock lever 15 together with the plunger 19 is moved along the G direction until the projection 19a of the plunger 19 reaches the right end of the elongated hole 13d of the brake lever 13.

Figure 8:
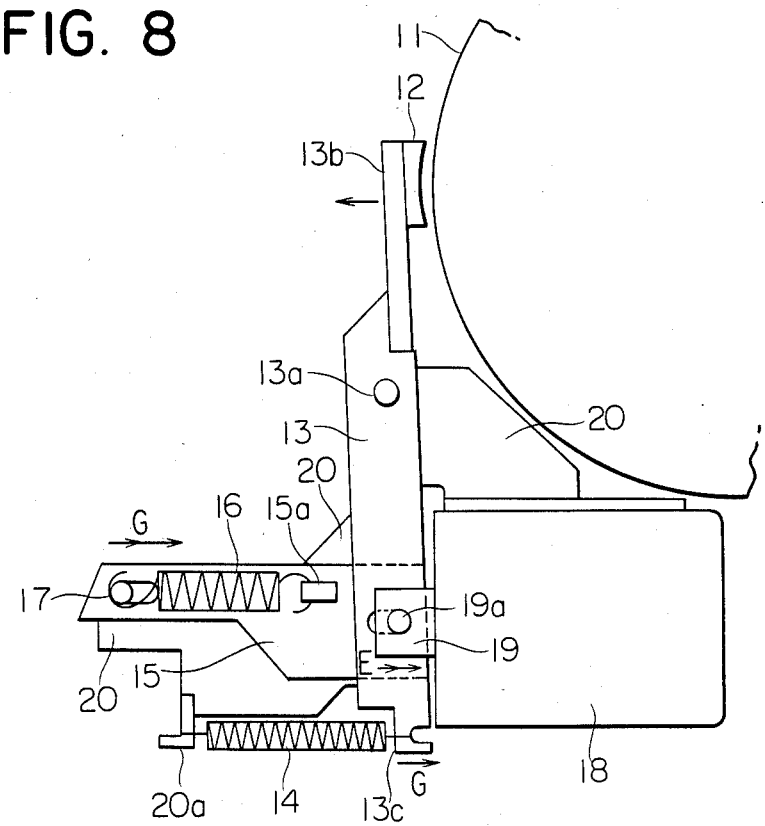
FIG. 8 is a plan view showing the attraction end state of the solenoid shown in FIG. 6.

In the second step, when the solenoid 18 attracts the plunger 19, the projection 19a reaches the right end of the elongated hole 13d of the brake lever 13. As shown in FIG. 8, the solenoid 18 moves the brake lever 13 together with the lock lever 15 along the G direction.

In this manner, when the solenoid 18 starts attracting the plunger 19, the lock lever 15 is moved against the biasing force of the spring 16 along the G direction in the first step. In the second step, the brake lever 13 is simultaneously moved against the biasing force of the spring 14 along the G direction while the lock lever 15 is being moved against the biasing force of the spring 16 along the G direction.

Thereafter, as shown in FIG. 8, when the solenoid 18 stops attracting the lock lever 15 and the brake lever 13, the rotary member 21 and the rotor 11 are released. The magnetic recording medium 1 can be rotated, and the magnetic head 7 is moved by the stepping motor 8 to the data zone 2, thereby recording data in or reproducing it from the magnetic recording medium 1.

When the data recording or reproduction is completed, the magnetic head 7 is moved to the shipping zone 3, the disk drive is turned off, and the solenoid 18 is deenergized. As a result, the magnetic head 7 is fixed by the lock lever 15 and the rotor 11 is locked by the brake lever 13.

According to the present invention, the circular hole is formed in the lock lever for regulating movement of the magnetic head and is engaged with the projection of the plunger, and the elongated hole is formed in the brake lever for regulating rotation of the rotor and is also engaged with the projection of the plunger. When the plunger is attracted by the solenoid, the lock lever is first moved and the brake lever together with the lock lever are moved after a predetermined period of time has elapsed, thereby decreasing the load of the solenoid. As a result, the solenoid requires a low power and has a compact size.

When the lock lever and the brake lever are simultaneously moved from the beginning, a tension load of about 200 g and a power of 5 W are required for the solenoid. However, with the present invention wherein the lock lever is first moved and then the brake lever together with the lock lever is moved, the solenoid power can be decreased to 3.87 W.

In the above embodiment, the circular hole 15c and the elongated hole 13d are formed in the lock lever 15 and the brake lever 13, respectively. However, an elongated hole and a circular hole may be formed in the lock lever 15 and the brake lever 13, respectively.

What is claimed is:

1. A magnetic recording/reproducing apparatus for use with a magnetic medium having a data zone subjected to data recording and reproduction and a shipping zone which is not subjected to data recording or reproduction, said apparatus comprising:

magnetic medium driving means for rotating the magnetic medium;

a magnetic head;

magnetic head moving means for moving the magnetic head along the magnetic medium upon rotation of a motor;

control means for controlling the magnetic head moving means to move the magnetic head to the shipping zone when the apparatus is powered and is not performing data recording or reproduction;

lock means for locking the magnetic head moving means in the shipping zone upon deenergization of the apparatus;

brake means for braking and locking the magnetic medium driving means upon deenergization of the apparatus;

said lock means includes a lock lever for locking movement of a rotary member coupled to the motor of the magnetic head moving means and having a hole, and spring means for biasing said lock lever to lock movement of said rotary member;

said brake means includes a brake lever for braking movement of the magnetic medium driving means and having a hole, and spring means for biasing said brake lever to brake movement of said rotating means; and said apparatus further includes a plunger having a projection selectively engaged at different positions within at least one of the holes, and a solenoid which is energized to attract the plunger upon energization of the apparatus and which is deenergized to release the plunger upon deenergization of the apparatus, one of the holes being formed to be tightly fitted with the projection of the plunger, the other of the holes being formed to be loosely fitted with the projection of the plunger, whereby the lock lever and the brake lever are started to move at different timings by the plunger when the plunger is attracted by the solenoid.

2. An apparatus according to claim 1, wherein one of said holes comprises a circular hole which is tightly fitted with the projection of the plunger, and the other comprises an elongated hole which is loosely fitted with the projection of the plunger.

3. An apparatus according to claim 1, wherein said solenoid attracts the lock lever against a biasing force of a respective spring means upon energization of the apparatus and releasing the lock lever upon deenergization of the apparatus; and said rotary member is coaxially mounted on a rotating shaft of the motor of the magnetic head moving means and has a projection extending radially outward therefrom; and further comprising:

a stopper engaged with the projection of the rotary member so as to stop the magnetic head in the shipping zone, whereby the stopper and the lock lever clamp the projection of the rotary member when the apparatus is deenergized.

* * * * *